April 9, 1946.
E. L. SINCLAIR ET AL
2,398,334
LEVEL INDICATING DEVICE
Filed March 17, 1945
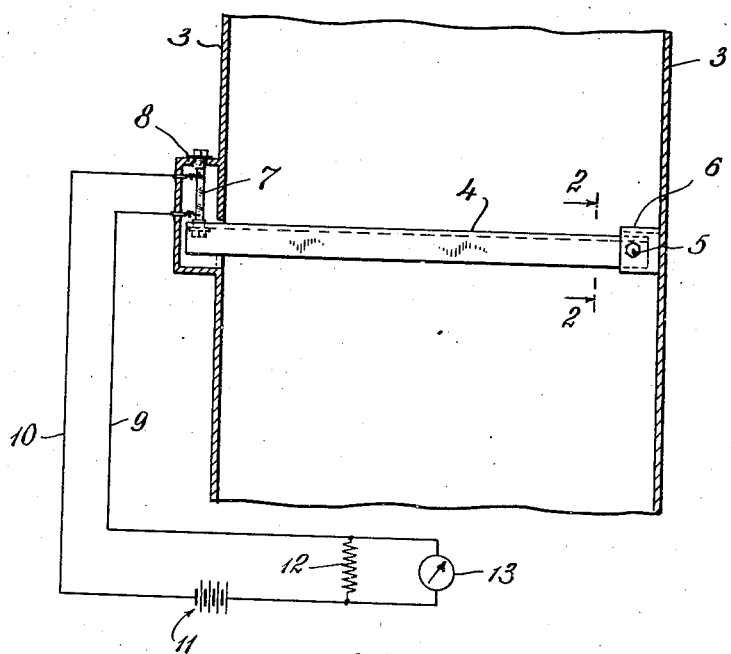
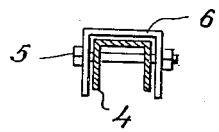
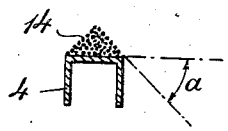
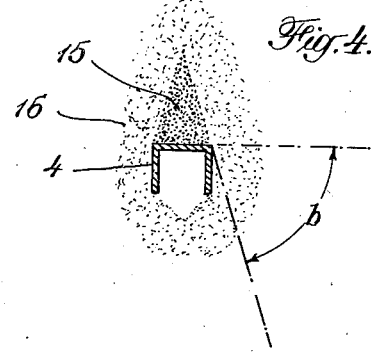
INVENTORS
EDWARD L. SINCLAIR
WILLIAM A. HAGERBAUMER
BY
AGENT OR ATTORNEY Patented Apr. 9, 1946

2,398,334

UNITED STATES PATENT OFFICE 2,398,334

LEVEL INDICATING DEVICE

Edward L. Sinclair, Manhasset, N. Y., and William A. Hagerbaumer, Westfield, N. J., assignors to Socony-Vacuum Oil Company, Incorporated, a corporation of New York Application March 17, 1945, Serial No. 583,330

1 Claim. (Cl. 177—311)

This invention has to do with devices for indicating the height of a particle form solid material in a bin, reactor or the like.

The invention may be understood most readily by reference to the drawing attached to and forming a part of this specification. In this drawing, Figure 1 shows a vertical cross-section of a bin or other device in which there is installed the indicating device of the invention, and as a portion of this figure there is shown in diagrammatic form, a wiring diagram indicating how the reading of the device is transmitted.

Figure II is a sectional view of a portion of the apparatus taken as indicated along the line 2—2 of Figure I.

Figures III and IV are explanatory of the nature of the device as will hereinafter appear.

Turning to Figure I, 3 indicates the side walls of a bin or other device utilized for the storage of particle form material. 4 is a beam extending transversely thereof pivotally supported at one end by pin 5, which pin 5 is in turn supported in a housing 6 therein. At the other end of beam 4, the beam is supported by a suspension link member 7 which may be housed in any suitable manner such as, for example, in a box 8 formed by an extension of the bin wall 3. This suspension link 7 is, in reality, an electrical "strain gauge." In other words, it is composed of a metal alloy whose conductivity towards electricity varies in accordance with the load that is imposed upon it. Such strain gauge materials are well known in the art. The load upon beam 4 is determined by means of an electrical circuit comprising leads 9 and 10 extending to either extremity of link member 7, a power source 11, a resistance 12 and an indicating instrument 13 in the manner quite usual in the art.

Figure II serves merely to show how the beam 4 is pivotally supported by pin 5 within housing 6.

Turning to Figures III and IV, which should be read together, we may see how the device works. First, the beam 4 necessarily has a flat or substantially flat top and consequently to secure structural rigidity together with lightness, is preferably constructed in the form of a channel opening downwardly, although any other flat top structural shape of sufficient rigidity, such as a simple flat, a square bar, or even an I beam may be used. When the level of particle form solid material in the bin is below that level at which the beam is placed, the beam will support upon its top a small amount of material designated as 14 and the amount of this material so supported will be determined by the top area of the beam and the angle of repose, a. With particle form solid materials of the nature of granular clays, fuller's earth, contact mass materials of clay nature in granular or pellet form, and the like, the angle of repose is of the order of about 30°.

Turning to Figure V, there is here shown conditions which apply when the bin is filled to a level above the location of the beam 4 with a solid particle form granular contact mass, which is assumed to be moving continuously or intermittently in a downward direction. In this case the amount of material which will be supported by the beam is different, and to make the part supported by the beam, designated as 15, and the part of the solid not supported by the beam, designated as 16, more clear, a difference in density of shading has been adopted although the actual packed density between the two portions of the particle form solid material is not particularly different. As shown in Figure IV, the amount now supported by beam 4 will be greater than in Figure III, and for the following reason.

Materials of this nature when moving continuously or intermittently downward tend to build up around and over obstructions in their path under conditions determined by what may be defined for our present purposes as an "angle of internal flow." This angle of internal flow is invariably greater than the angle of repose and for materials of the type for which this indicator is deemed most suited, namely, particle form solid of clay-type such as filter clays, catalyst and the like has experimentally determined values ranging up towards 70° with the horizontal, as shown by the angle marked b in Figure IV. Consequently, under these conditions, the beam 4 when submerged in the particle form solid is seen to carry a greater load than when free.

Turning back to Figure I, this difference in loading will be reflected in the difference in conductivity of suspension link 7, which is thereafter reported in a difference of reading in instrument 13. In most cases to which this is applied, instrument 13 will be calibrated merely to show a loaded or not loaded position and may be supplemented or replaced by a relay operated set of lights or even a single light so attached to the circuit or integrated therewith, as is quite well known in the art, to indicate that the solid material in the bin is above or below the level of beam 4.

We claim:

Means for indicating the level of granular material in a bin comprising: a flat topped beam member extending transversely of the bin, a pivot mounting for one end of said beam, a suspension member supporting the opposite end of said beam including a suspension link made of a metal whose electrical conductivity changes in response to the mechanical loading to which it is subjected, and an electrical circuit adapted to indicate change in conductivity of said link.

EDWARD L. SINCLAIR.
WILLIAM A. HAGERBAUMER.